(12) United States Patent
Xia et al.

(10) Patent No.: US 8,174,685 B2
(45) Date of Patent: May 8, 2012

(54) MEASUREMENT OF NONLINEAR EFFECTS OF AN OPTICAL PATH

(75) Inventors: Tiejun J. Xia, Richardson, TX (US); Glenn A. Wellbrock, Wylie, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 312 days.

(21) Appl. No.: 12/419,494

(22) Filed: Apr. 7, 2009

(65) Prior Publication Data

US 2010/0253936 A1 Oct. 7, 2010

(51) Int. Cl.
*G01N 21/00* (2006.01)
(52) U.S. Cl. ...................................... 356/73.1
(58) Field of Classification Search .................. None
See application file for complete search history.

(56) References Cited

U.S. PATENT DOCUMENTS

| | | | |
|---|---|---|---|
| 7,835,643 B2 * | 11/2010 | Futami et al. ................ 398/25 |
| 2002/0149812 A1 | 10/2002 | Hong et al. | |
| 2004/0057735 A1 | 3/2004 | Uesaka | |
| 2006/0078336 A1 | 4/2006 | McNicol et al. | |
| 2007/0092261 A1 | 4/2007 | Fan et al. | |

\* cited by examiner

*Primary Examiner* — Tu Nguyen

(57) ABSTRACT

A network device may include a receiver to receive optical pulses from an optical path, wherein the optical pulses include a plurality of intensities and represent data. The network device may also include a processor to determine a rate of bit errors introduced during propagation of the optical pulses through the optical path and to determine a parameter indicative of nonlinear effects of the optical path based on the rate of bit errors and the plurality of intensities.

24 Claims, 13 Drawing Sheets

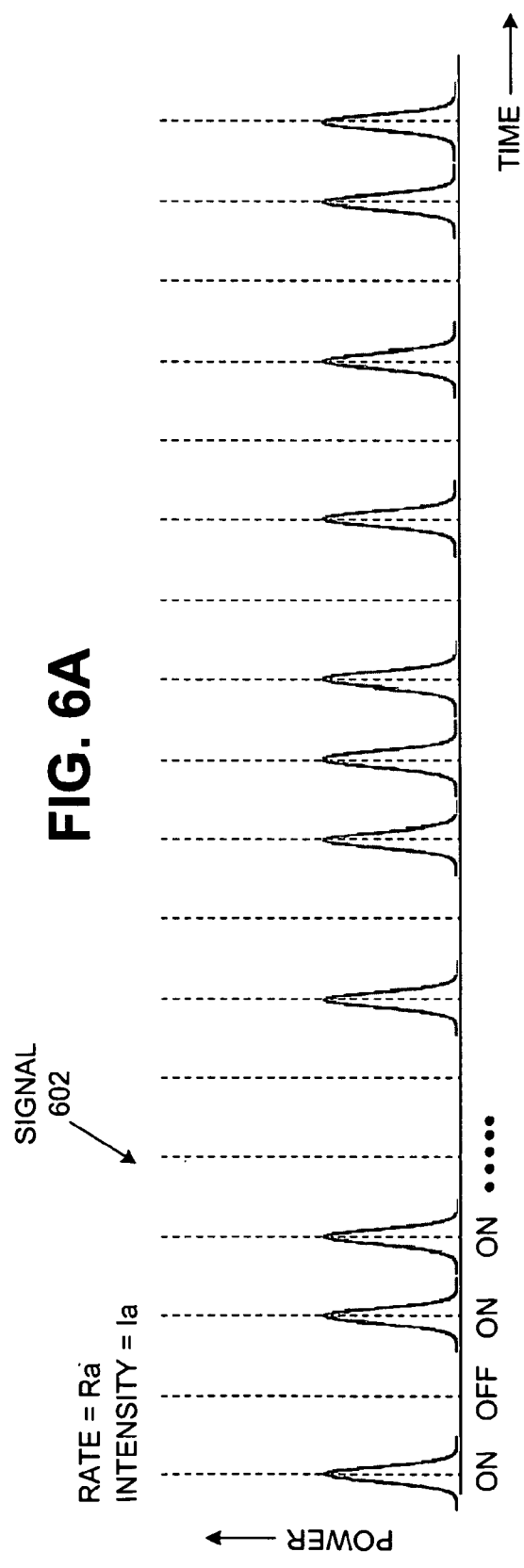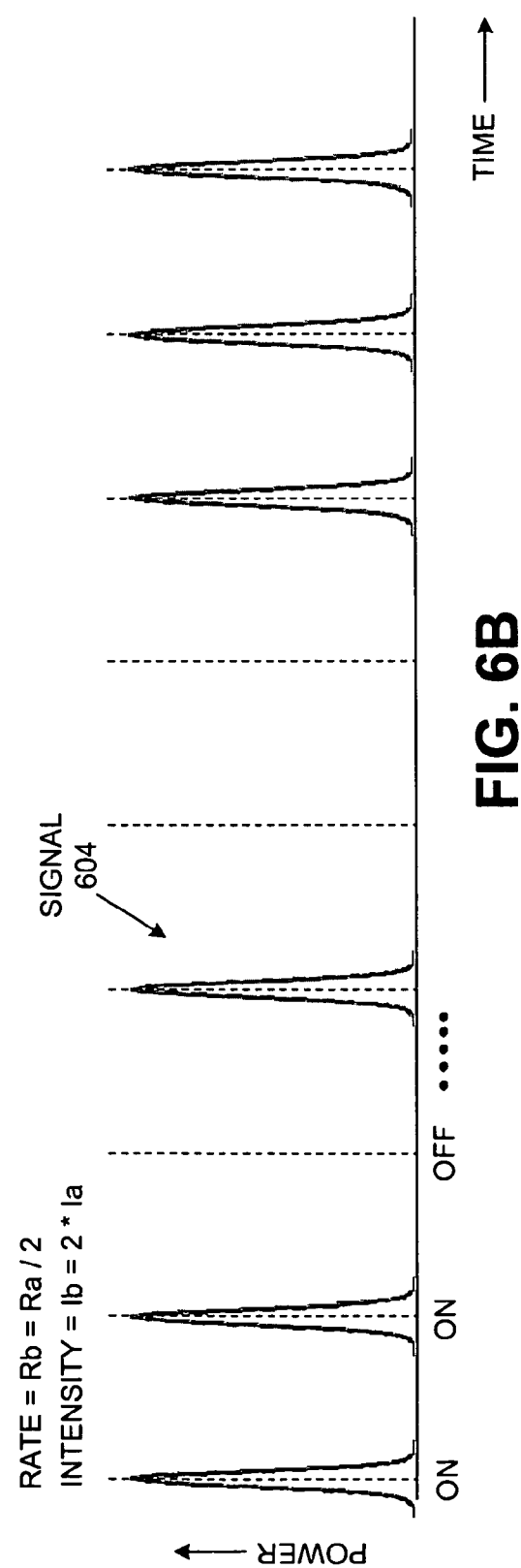

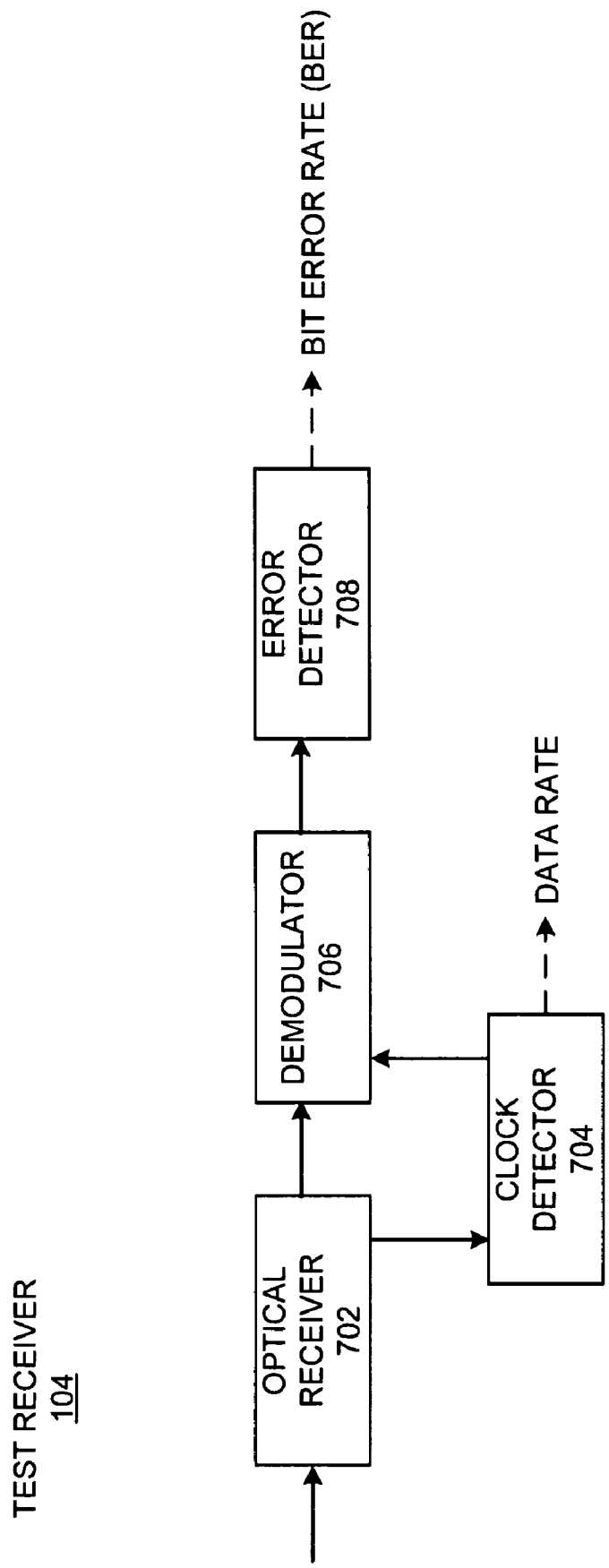

800

1000

1200

MEASUREMENT OF NONLINEAR EFFECTS OF AN OPTICAL PATH

BACKGROUND INFORMATION

Businesses and individuals increasingly rely on computer networks for communications. For example, home users expect to receive television programming on-demand over digital networks. Businesses may rely on applications (e.g., database applications, mail server applications, word processing applications, etc.) provided over a network, such as the public Internet or a leased private network. As time passes, communication networks are expected to carry more data through some of the same communication paths in a more reliable manner.

BRIEF DESCRIPTION OF THE DRAWINGS

FIGS. 6A and 6B are plots of exemplary optical signals at different data rates;

FIG. 7 is a block diagram of exemplary components of a test receiver;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Nonlinear effects may impact the signal integrity of phase modulated optical signals because the nonlinearity may contribute to phase noise. Therefore, as optical networks move from amplitude modulation to phase modulation in high speed networks (e.g., 40 Gbps and 100 Gbps networks), the measurement of nonlinear effects may become more useful. In addition, because optical nonlinear effects, unlike linear effects, are nondeterministic, they are more difficult for a digital signal processor remove from an optical signal. Further, Dense Wavelength Division Multiplexing (DWDM) optical networks are increasingly moving to mesh-based architectures. In mesh-based architectures, as well as other architectures, measurement of optical nonlinearity effects of deployed, in-service optical fibers may become increasingly useful. That is, because the end-to-end path of a channel may not be known beforehand, the nonlinear cross-channel effects may become increasingly problematic.

Embodiments described herein allow for the measurement of nonlinear effects of optical paths. These embodiments may measure nonlinear effects in deployed, in-service optical paths that may include multiple sections or spans of optical fibers. These embodiments may also comply with the average power requirements of optical add-drop multiplexers currently deployed and, in some embodiments, measurements do not interfere with signals on other channels in an optical fiber.

Figure 1:
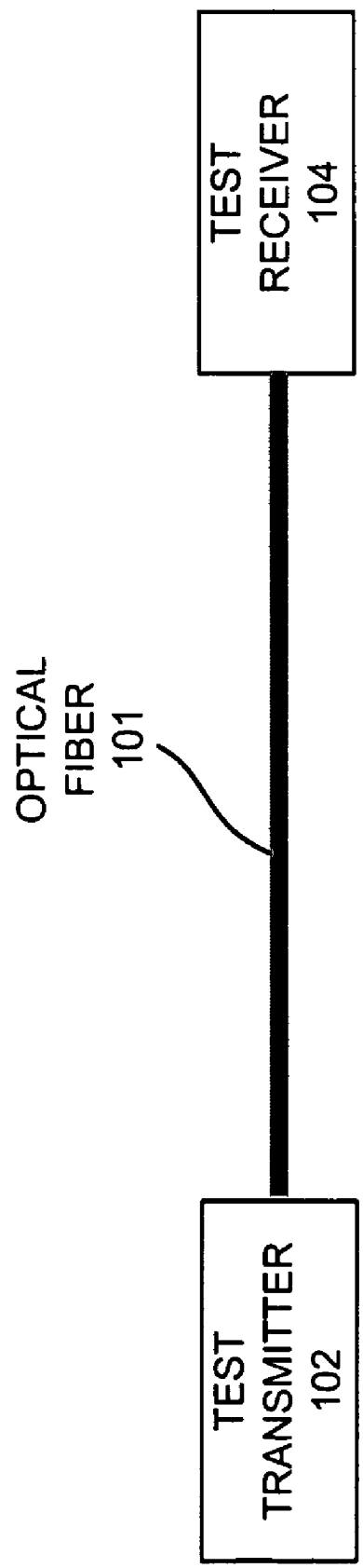
FIG. 1 is a block diagram of an exemplary measurement configuration for an optical path.

FIG. 1 is a block diagram of an exemplary measurement configuration 100 for measuring nonlinear effects in an optical path. Configuration 100 may include an optical fiber 101, a test transmitter 102, and a test receiver 104. Test transmitter 102 may transmit signals through fiber 101 (e.g. the signals propagate through fiber 101) to test receiver 104. Analysis of the signal received by test receiver 104 may reveal a measurement of the nonlinear effects of the optical path of fiber 101.

Measurement configuration 100 may include more, fewer, or different devices than shown. Further, although FIG. 1 shows devices in a particular configuration, these devices and other devices may also be arranged in other configurations.

As discussed above, fiber 101 may include properties that effect the transmission (e.g., propagation) of signals through fiber 101 in a nonlinear fashion. These nonlinear effects may introduce errors in the data during propagation of signals through fiber 101. The rate of the errors (e.g., the bit error rate (BER)) introduced during propagation by the nonlinear effects may increase as the optical power of the signal passing through fiber 101 increases. On the other hand, the BER introduced during propagation by other properties of fiber 101 (e.g., amplitude noise) may decrease as the optical power of the signal passing through fiber 101 increases (e.g., as the optical signal to noise ratio (OSNR) increases). These relationships are described with respect to FIGS. 2A and 2B.

Figure 2A:
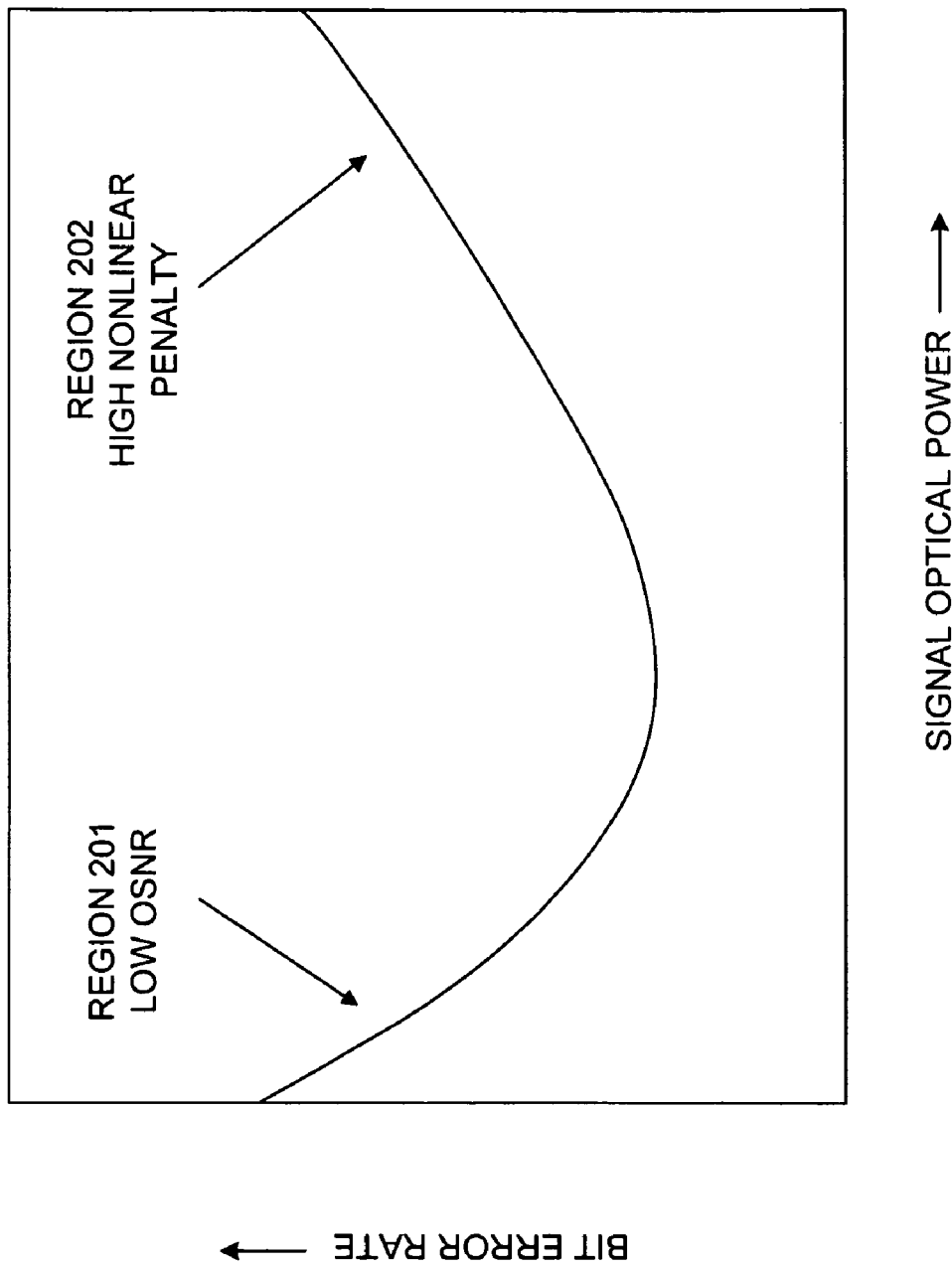
FIGS. 2A and 2B are exemplary plots of the bit error rate with respect to the signal power through the optical path of FIG. 1.

FIG. 2A is an exemplary plot of the BER with respect to the signal power through a fiber. In FIG. 2A, the abscissa represents optical power of a signal and the ordinate represents the corresponding BER. As shown, the BER may be relatively high in region 201 when the optical power of the signal is low. The relatively high BER in region 201 may be the result of a low OSNR. In this region, as the optical power of the signal increases, the BER decreases. As the optical power increases further, however, the curve enters region 202 where the BER is once again relatively high and increases with increased optical power. In region 202, the nonlinear effects may be more influential than in region 201, and these nonlinear effects may create a high penalty with respect to the BER. In the middle of region 201 and region 202, however, the BER reaches a minimum where the nonlinear penalty is not significant enough to erase the benefits of the higher OSNR.

Figure 2B:
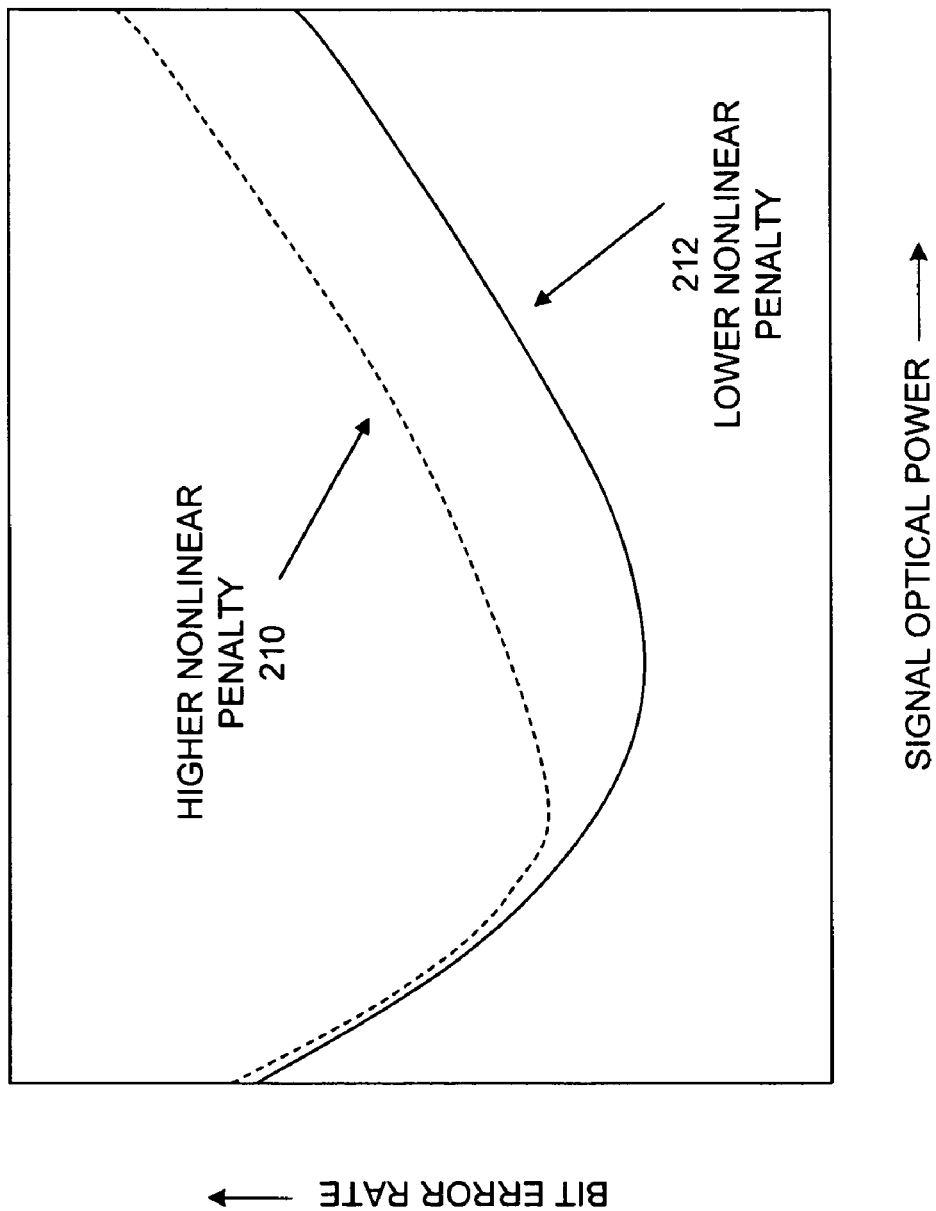

FIG. 2B shows two exemplary plots of the BERs with respect to the signal power through two different optical paths (e.g., two different fibers). In FIG. 2B, like in FIG. 2A, the abscissa represents optical power of a signal and the ordinate represents the corresponding BER. A curve 210 shows the BER with respect to optical power for one fiber and a curve 212 shows the BER with respect to optical power for a second fiber. As shown in FIG. 2B, the nonlinear penalty of the first fiber (represented by curve 210) is higher than the nonlinear penalty of the second fiber (represented by curve 212). As such, the nonlinear effects of the first fiber are greater than the nonlinear effects of the second fiber. In one example, the nonlinear effects of the second fiber may be "within budget" for the optical network, but the nonlinear effects of the first fiber may not be within budget and the first fiber may require diagnostics.

Figure 3:
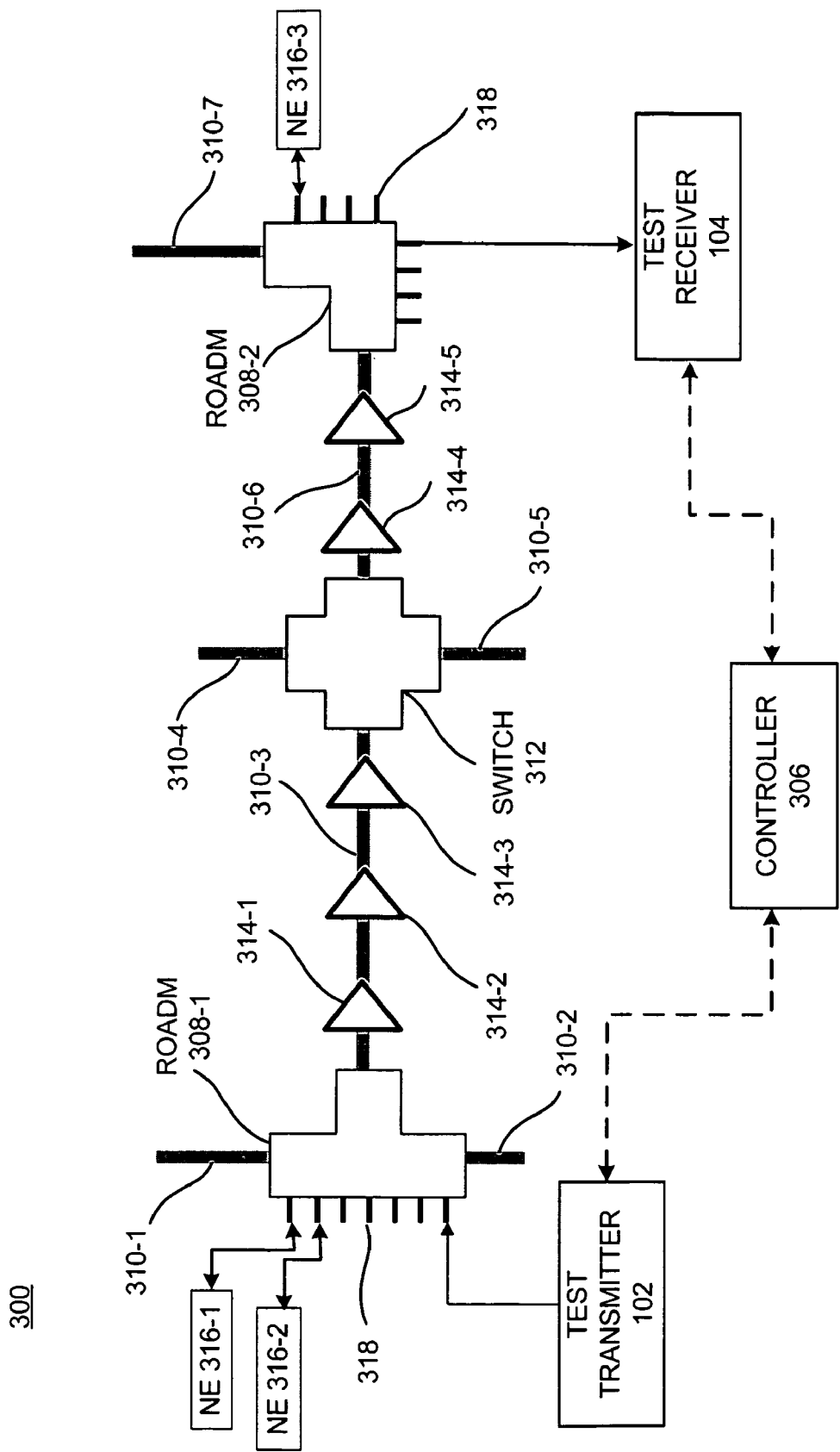
FIG. 3 is a block diagram of an exemplary deployed, in-service network.

In some embodiments, test transmitter 102 may not be able to arbitrarily change the optical power of signals transmitted to test receiver 104. Existing equipment in a network may regulate the optical power of signals to prevent cross-channel interference. For example, some network equipment, such as optical multiplexers, may regulate the average power of optical signals. The degree of nonlinearity, however, may depend on the intensity of an optical pulse. The intensity of the optical pulse may change with the data rate, even in a system where the average power of the optical signal is regulated (e.g., remains constant or is kept below a specified value). FIG. 3 is an example of a network including network equipment that may regulate the average power of optical signals.

FIG. 3 is a block diagram of an exemplary network 300. Network 300 may be a deployed (e.g., in-service, operational) network, e.g. a network that has already been installed in the field and may connect existing customer premises. Network 300 may include test transmitter 102, test receiver 104, a controller 306, reconfigurable optical add-drop multiplexers (ROADMs) 308-1 and 308-2 (individually ROADM 308-x, collectively ROADMs 308), optical fibers 310-1 through 310-7 (individually fiber 310-x, collectively hereinafter fibers 310), an optical switch 312, amplifiers 314-1 through 314-5 (individually amplifier 312-x, collectively amplifiers 314), and network elements 316-1 through 316-3 (individually NE 316-x, collectively NE 316).

Test transmitter 102 may transmit encoded data at different data rates and different signal intensities through an optical path (e.g., an optical fiber). Test receiver 104 may receive encoded data from test transmitter 102 and may determine the data rate of the received encoded data. Test receiver 104 may also determine the BER of the received encoded data.

Controller 306 may include one or more computing modules for hosting programs, databases, and/or applications, such as an application to analyze nonlinear effects in an optical path. Controller 306 may instruct test transmitter 102 to transmit encoded data, may instruct test transmitter 102 to transmit at a particular data rate and/or a particular signal intensity. In one embodiment, test transmitter 102 may include some of the functionality and components of controller 306.

Controller 306 may also instruct test receiver 104 to receive the encoded data transmitted from test transmitter 102. Controller 306 may also receive the data rate and BER determined by the test receiver 104. Controller 306 may analyze test results, including the BER and the corresponding data rate and/or signal intensities. In one embodiment, test receiver 104 may include some of the functionality and components of controller 306.

ROADM 308-x is a multiplexer that can add data to an optic fiber 310-x for transport to another network device, such as switch 312. ROADM 308-x may include a group of ports 318 for receiving optical signals from network devices, such as NEs 316 or test transmitter 102, for example, for adding to an optical fiber. Ports 318 may also be used for dropping signals from fiber 310-x to provide optical signals to network devices, such as test receiver 104, for example. In one embodiment, each of ports 318 may correspond to a different channel and a different wavelength in a wavelength division multiplexing (WDM) network. ROADM 308-x may allow an optical signal to be added or dropped without converting the signal (or other signals on the fiber) to electronic (e.g., non-optical) signals. In one embodiment, ROADM 308-x may also include a switch, which may allow wavelength steering, e.g., passing wavelengths from one fiber span to another fiber span independently of other wavelengths without electrical conversion.

ROADM 308-x may automatically balance power among channels. In other words, ROADM 308-x may monitor channel power to achieve a pre-determined average power for each channel. In one embodiment, a gain equalization mechanism in ROADM 308-x may automatically adjust the power of a channel to a substantially constant level to avoid large power differences between channels. In this embodiment, power may be more evenly distributed across channels to reduce channel interference. The gain equalization, however, may concern only the average power of the channel, not that of each individual bit or pulse.

Optical fiber 310-x may include a single length of fiber or may include multiple spans of fibers. A single length of fiber may include, for example, a 1,000 km length of optical fiber. Multiple spans may include optical fibers strung together between optical amplifiers, ROADMs, and/or switches, such as amplifiers 314, ROADMs 308, and/or switch 312.

Switch 312 may allow wavelength steering, e.g., passing wavelengths from one fiber span to another fiber span independently of other wavelengths without electrical conversion. Amplifier 314-x may amplify an optical signal in a fiber without converting the signal into an electrical signal.

NEs 316 may use network 300, including ROADMs 308, amplifiers 314, and switch 310, for communicating with other NEs 316. For example, NE 316-1 may reside in a neighborhood for providing the neighborhood residents access to the Internet and to services that may be associated with, for example, to NE 316-3. NE 316-x may receive optical signals on a channel from ROADM 308-x that are intended for the particular NE 316-x. NE 316-x may also transmit an optical signal on a channel to ROADM 308-x that may be intended, for example, for a different NE 316-x in network 300. NE 316-x may include, or may be coupled to, computers (e.g., servers, desktop computers, and/or laptop computers), televisions, telephones, personal digital assistants (PDAs), routers, switches, or any other computational device that may receive and transmit data.

Exemplary network 300 may include more, fewer, or different devices than shown. For example, network 300 may include hundreds or thousands of NEs, fibers, ROADMs, amplifiers, and/or switches. Further, although FIG. 3 shows devices in a particular configuration, they may also be arranged in other configurations. For example, in one embodiment, one or more of ROADM 308-x may include test transmitter 102 and test receiver 104. In this embodiment, controller 306 may remotely operate the test equipment (as a component of ROADM 308-x) and analyze the results.

Network 300 may include a mesh network, the Internet, an ad hoc network, a local area network (LAN), a wide area network (WAN), a metropolitan area network (MAN), a high-speed fiber optic network (e.g., FiOS™), or any other network or combinations of networks.

As mentioned above, controller 306 may include one or more computing modules for hosting programs, databases, and/or applications, such as a network test application. The other devices in network 300, such as test transmitter 102 and/or test receiver 104, may also include one or more computing modules.

Figure 4:
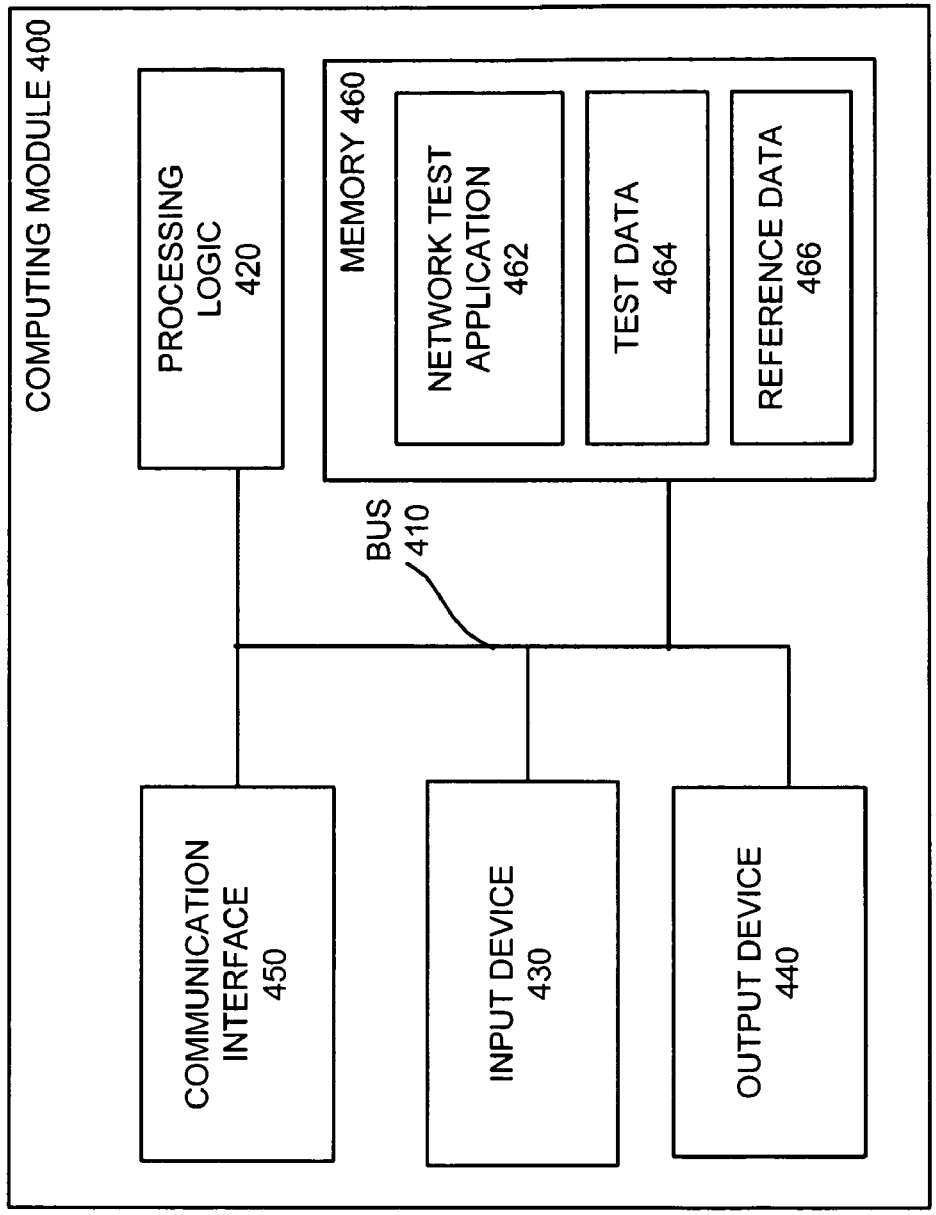
FIG. 4 is a block diagram of exemplary components of a computing module.

FIG. 4 is a block diagram of exemplary components of a computing module 400. Computing module 400 may include a bus 410, processing logic 420, an input device 430, an output device 440, a communication interface 450, and a memory 460. Computing module 400 may include other components (not shown) that aid in receiving, transmitting, and/or processing data. Moreover, other configurations of components in computing module 400 are possible.

Bus 410 may include a path that permits communication among the components of computing module 400. Processing logic 420 may include any type of processor or microprocessor (or groups of processors or microprocessors) that interprets and executes instructions. In other embodiments, processing logic 420 may include an application-specific integrated circuit (ASIC), a field-programmable gate array (FPGA), or the like.

Input device 430 may include a device that permits a user to input information into computing module 400, such as a keyboard, a mouse, a pen, a microphone, a remote control, a touch-screen display, etc. Output device 440 may include a device that outputs information to the user, such as a display, a printer, a speaker, etc.

Input device 430 and output device 440 may allow the user to activate a particular service or application, such as a network test application. Input device 430 and output device 440 may allow the user to receive and view a menu of options and select from the menu options. The menu may allow the user to select various functions or services associated with applications executed by computing module 400.

Communication interface 450 may include any transceiver-like mechanism that enables computing module 400 to communicate with other devices and/or systems. Communication interface 450 may include an optical transmitter that may modulate a carrier signal based on encoded data and/or a receiver that may demodulate a received signal to recover the encoded data. Alternatively, communication interface 450 may include a transceiver to perform functions of both a transmitter and a receiver.

Communications interface 450 may include a network interface card, e.g., an optical line card or an Ethernet card, for communicating over an optical cable or an Ethernet cable. Communications interface 450 may include a wireless network interface card (e.g., a WiFi card) for wireless communications. Communication interface 450 may also include, for example, a universal serial bus (USB) port for communications over a cable.

Memory 460 may include a random access memory (RAM) or another type of dynamic storage device that may store information and instructions, e.g., an application and application data, for execution by processing logic 420; a read-only memory (ROM) device or another type of static storage device that may store static information and instructions for use by processing logic 420; and/or some other type of magnetic or optical recording medium and its corresponding drive, e.g., a hard disk drive (HDD), for storing information and/or instructions.

Memory 460 may include a network test application 462 to measure network 300 for nonlinear effects in fibers 310. Memory 460 may also store measurement data 464, which may reflect the results of tests performed by network test application 462. Memory 460 may also store reference data 466, which may reflect ideal or expected results for network measurements, or data for comparing to measurement data 464, for example.

Computing module 400 may perform certain operations, as described herein. Computing module 400 may perform these operations in response to processing logic 420 executing software instructions contained in a computer-readable medium, such as memory 460. A computer-readable medium may be defined as a physical or logical memory device. The software instructions may be read into memory 460 from another computer-readable medium or from another device via communication interface 450. The software instructions contained in memory 460 may cause processing logic 420 to perform processes that are described herein.

Figure 5:
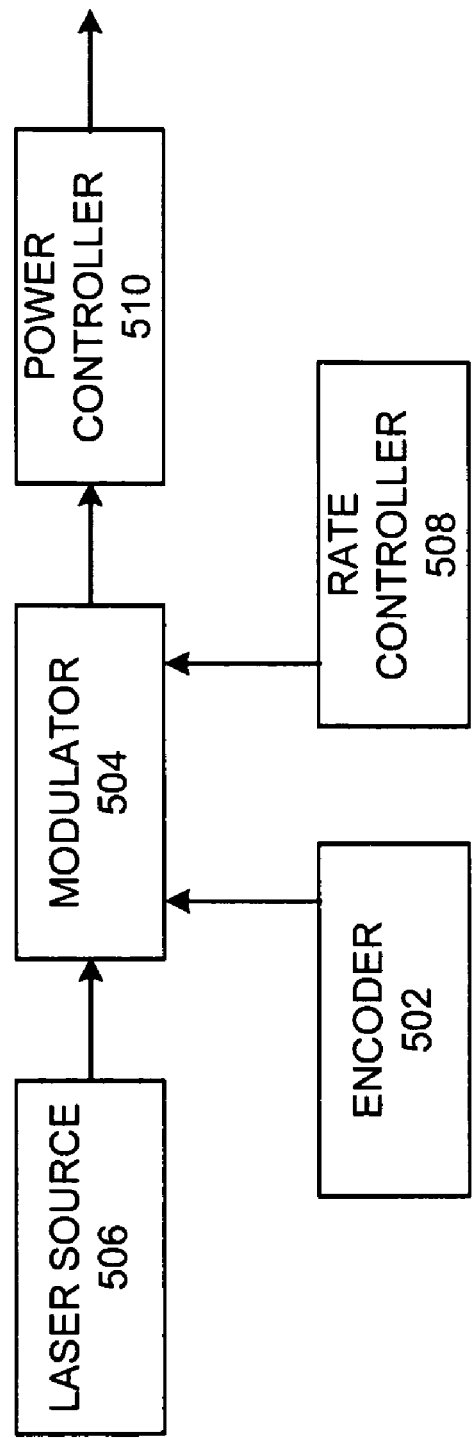
FIG. 5 is a block diagram of exemplary components of a test transmitter.

FIG. 5 is a block diagram of exemplary components of test transmitter 102. Test transmitter 102 may include an encoder 502, a modulator 504, a laser source 506, a rate controller 508, and a power controller 510. Test transmitter 102 may include more, fewer, or different components than shown. Further, although FIG. 5 shows components in a particular configuration, these components and other components may also be arranged in other configurations.

Encoder 502 may encode test data for test transmitter 102 to send to test receiver 104. The test data may include predetermined test patterns. Modulator 504 may input the test data and may modulate a laser from laser source 506 according to the test data. Laser source 506 may output a wavelength of light that may be tuned to match an open channel in an optical path, such as an open channel in network 300 between ROADM 308-1 and 308-2. Modulator 504 may also modulate the encoded data according to a data rate output by rate controller 508. Rate controller 508 may sweep through data rates (e.g., starting at a low data rate and increasing in steps to a high data rate). In this embodiment, modulator 504 may output modulated, encoded data at many different data rates.

Power controller 510 may ensure that the average power of the channel signal output is within the bounds expected by ROADM 508-$x$, for example. If the average power of the channel signal were greater than expected by ROADM 508-$x$, then a gain equalization mechanism in ROADM 508-$x$ may adjust the power of the channel to avoid large average power differences between channels. Power controller 510 may allow test transmitter 102 to meet the power requirements of ROADM 508-$x$ without disturbing other channels, and without having to adjust ROADM 508-$x$ during testing. Power controller 510, in conjunction with modulator 504, encoder 502, and rate controller 508, may keep the transmitted test signal within a range (e.g., less than a value) to keep the channel "alive" in the ROADM-based DWDM system, such as that shown in FIG. 3.

One cause of the nonlinear effects in a fiber includes third-order nonlinear phase changes. These nonlinear phase changes may affect the integrity of self-phase modulation (SPM) signals, cross phase modulation (XPM) signals, and four-wave mixing (FWM) signals. Because SPM, XPM, and FWM may have the same root for their nonlinearity, the nonlinear effects of an optical path may be measured using any one of these modulation techniques. Therefore, in one embodiment, power controller 510 in conjunction with modulator 504, encoder 502, and rate controller 508, may output signals that employ SPM.

In one embodiment, modulator 504 outputs a return-to-zero optical signal. In this embodiment, each ON bit in a transmitted signal may have a pulse that returns to zero even when followed by subsequent ON bits, for example. Thus, if the average power of a transmitted signal is to remain relatively constant, the power intensity of each bit at a high data rate may be lower than the power intensity of each bit at a lower rate. In other words, because there are more ON bits in a given period of time at a higher data rate than a lower data rate, each ON bit at a higher data rate may have a lower intensity in order to meet the average power requirement for the channel. Stated another way, because there are fewer ON bits in a given period of time at a lower data rate than a higher data rate, each ON bit at the lower data rate may have a higher intensity and still meet the average power requirement for the channel. FIGS. 6A and 6B, discussed below, demonstrates this relationship between intensity and data rate.

FIGS. 6A and 6B are plots showing power for two exemplary optical signals at different data rates. As shown in FIGS. 6A and 6B, the abscissa represents time and the ordinate represents power. The data rate of signal 602 is defined as $R_a$ and the intensity as $I_a$. In FIG. 6B, the data rate of signal 604 is $R_b$ and is half the data rate of signal 602, e.g, $R_a/2$. Because the average power of signal 602 is the same as the average power of signal 602, however, the intensity of an ON bit pulse of signal 604 ($I_b=2I_a$) is twice that of an ON bit pulse of signal 602 (Ia). Intensity may measure, for example, the energy flux (e.g., radiant intensity, luminous intensity, or irradiance) during the pulse of a signal. In the embodiment shown, the pulse width corresponding to the data rate of FIG. 6A is the same as the pulse width corresponding to the data rate of FIG. 6B, which may help avoid spectral width change to achieve consistent measurements of nonlinear effects over the different data rates.

FIG. 7 is a block diagram of exemplary components of test receiver 104. Test receiver 104 may include an optical receiver 702, a clock detector 704, a demodulator 706, and an error detector 708. Test receiver 104 may include more, fewer, or different components than shown. Further, although FIG. 7 shows components in a particular configuration, these components and other components may also be arranged in other configurations.

Optical receiver 702 may receive the test signal, transmitted form test transmitter 102, that has been dropped from ROADM 308-x, for example. The received test signal may include linear and nonlinear effects caused by propagation through the medium, such as fiber segments 310-3 and 310-6.

Clock detector 704 may recover the clock of the test signal. Clock detector 707 may also inform network test application 462 (e.g., stored in controller 306) of the bit rate, and thus the intensity, of the received bits in the test signal.

Demodulator 706 may receive the signal from optical receiver 702 and may demodulate the signal to recover the encoded test data. Demodulator 706 may output the test data to error detector 708. Error detector 708 may determine if any errors, which may occur during transport of the optical signal through fiber spans 310-3 and 310-4, exist in the received test data. In one embodiment, error detector 708 is familiar with the pre-determined test patterns sent by test transmitter 102 and, therefore, can determine the number of errors in the received data. Alternatively, error detector 708 may use a cyclic redundancy check (CRC), error correction code (ECC) blocks, or another type of error detection mechanism or method. Error detector 708 may determine and output the BER of the test data. Error detector 704 may also inform network test application 462 (e.g., stored in controller 306) of the detected BER, which may be associated with corresponding data rate output from clock detector 704.

Figure 8:
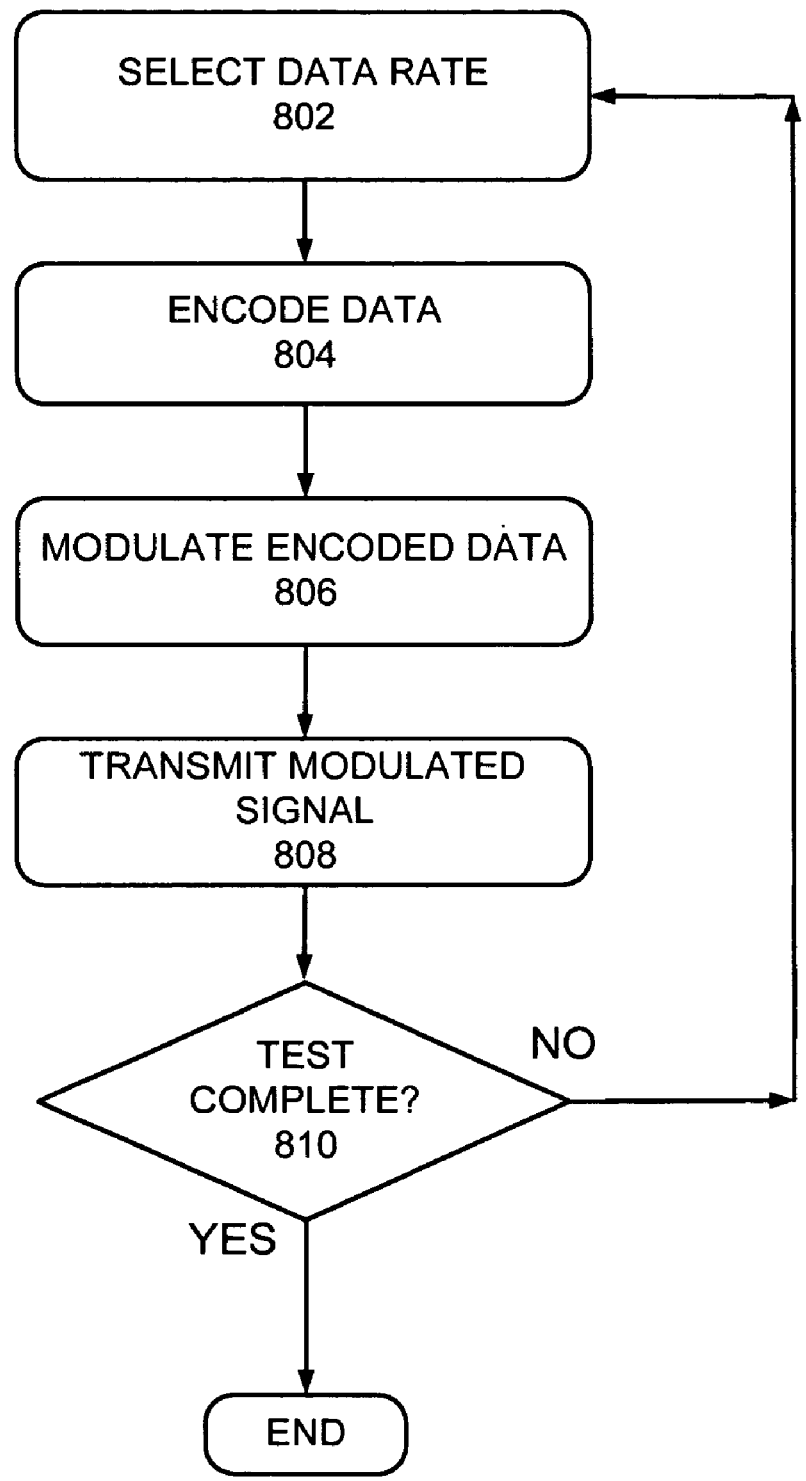
FIG. 8 is a flowchart of an exemplary process for determining the nonlinearity of an optical path.

FIG. 8 is a flowchart of an exemplary process 800 for measuring the nonlinear effects of an optical path. Process 800 may be performed in conjunction with a process 1000, described with respect to FIG. 10 below. Exemplary process 800 is described from the perspective of test transmitter 102, whereas exemplary process 1000 is described from the perspective of test receiver 104.

A data rate may be selected (block 802). For example, rate controller 508 of test transmitter 102 may select a data rate from a range of data rates (e.g., between start data rate Rs to end data rate Re) for testing. If process 800 is just starting, rate controller 508 may select start data rate Rs, such as 10 Mbps, for transmitting encoded test data. If process 800A has already been running (e.g., process 800 just returned from block 810), then rate controller 508 may select an untested data rate, e.g., one that is incrementally higher than the previously tested data rate. For example, rate controller 508 may select 20 Mbps as the second data rate, e.g., one that is 10 Mbps higher than the first tested data rate (e.g., 10 Mbps).

Test data may be encoded (block 804). The encoded test data may include pre-determined test patterns or error correction information, such as CRCs, ECC blocks, or other error correction information. The encoded test data may be such that the resulting optical signal will include a known number of ON bits to control the intensity of each ON bit.

The encoded data may be modulated (block 806). Modulator 504 may receive the encoded data from encoder 502 and the data rate from rate controller 508 and may modulate the light received from light source 506 accordingly. The modulated encoded signal may include RZ modulation, as described above.

The modulated encoded data signal may be transmitted (block 808). Power controller 510 may received the modulated encoded test data from modulator 504 and may transmit an optical signal along an optical path. In the case of measuring the nonlinear effects of the optic path in network 300 (e.g., span 310-3 and span 310-6), power controller 510 may send the signal to ROADM 308-1. In this example, the average power Pa of the channel signal may be within the bounds expected by ROADM 308-1. As discussed above, however, even though the channel signal has average power Pa, the intensity of the signals during an ON bit pulse may be different at different data rates. In the case of measuring the nonlinear effects of the optic path of cable 101 in measurement configuration 100, power controller 510 may send the signal through cable 101.

If the test is not complete (block 810: NO), then process 800 may continue to block 802 where a new data rate is selected. Process 800 may not be complete, for example, if the entire data rate range for testing (e.g., Rs to Re in 10 Mbps increments) has not yet been fully tested. If the test is complete (block 810: YES), then process 800 may end. Process 800 may be complete, for example, if the entire data rate range has been fully tested.

Figure 9:
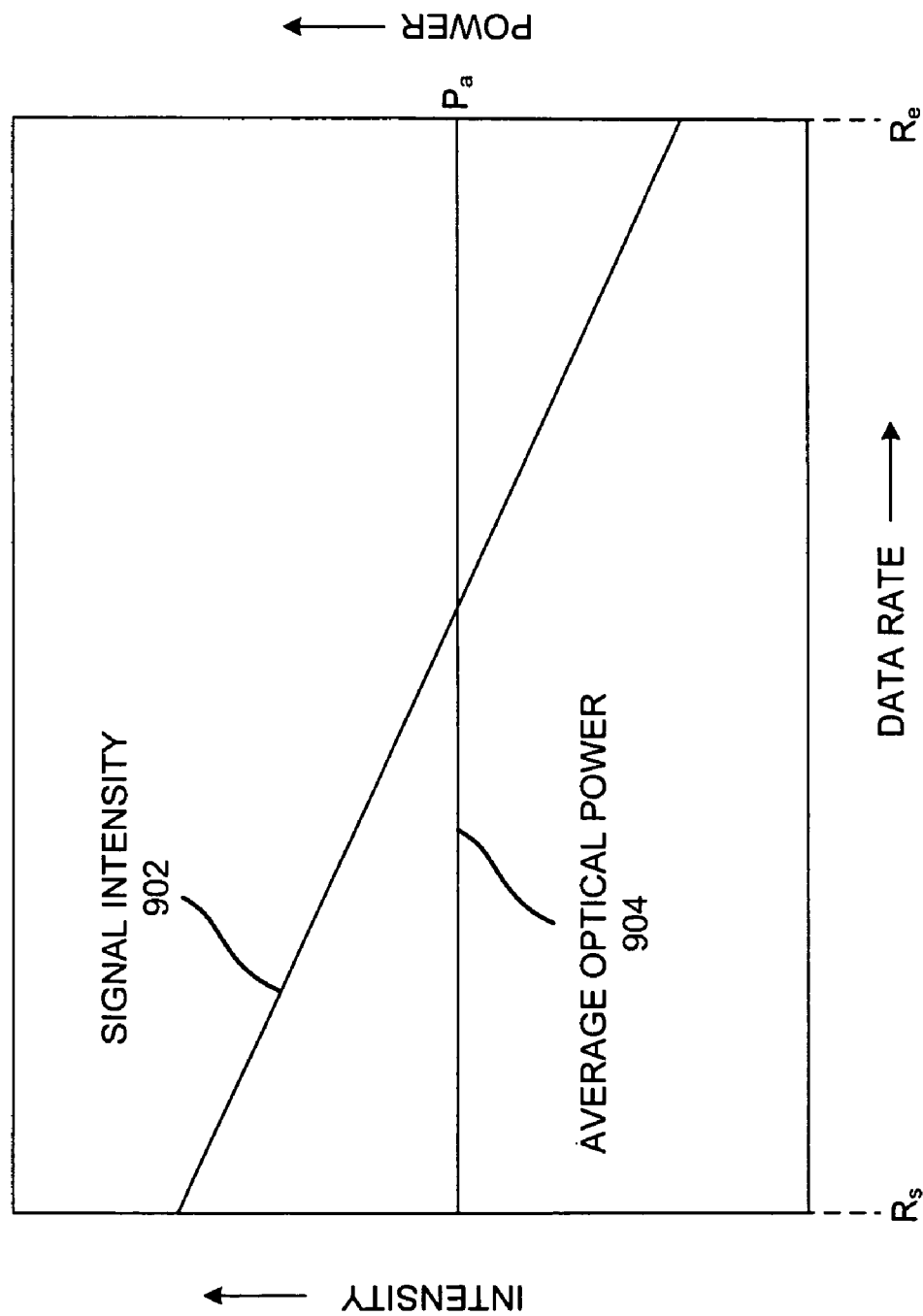
FIG. 9 is a plot of signal intensity and optical power with respect to data rate.

The loop defined in process 800 may also be described in terms of FIG. 9. FIG. 9 is a plot of signal intensity and optical power with respect to the data rate, e.g., the data rate chosen at block 802 by rate controller 508. In FIG. 9, the abscissa represents the data rate of a signal and the ordinate represents the intensity (on the left side) and the corresponding average power (on the right side). As shown in FIG. 9, as the data rate increases (e.g., between start rate Rs and end rate Re), the signal intensity 902 decreases. Average optical power 904 of the channel signal is kept constant, however, as the data rate increases (e.g., between start rate Rs and end rate Re).

Figure 10:
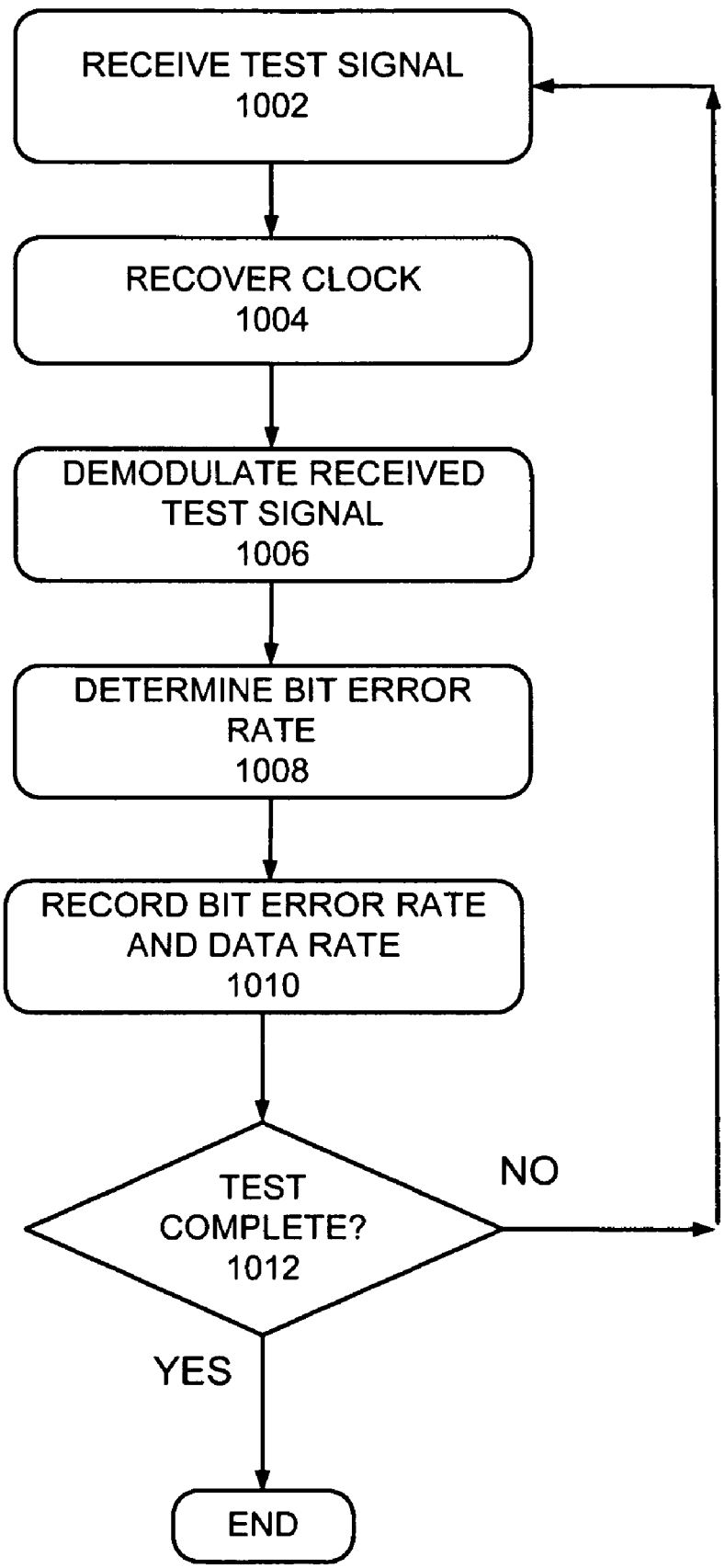
FIG. 10 is a flowchart of an exemplary process for determining the nonlinearity of an optical path.

FIG. 10 is a flowchart of exemplary process 1000 for measuring the nonlinear effects of an optical path. As mentioned above, process 1000 may be performed in conjunction with process 800. Exemplary process 1000 is described from the perspective of test receiver 104, whereas exemplary process 800 is described from the perspective of test transmitter 102.

A test signal may be received (block 1002). For example, optical receiver 702 of test receiver 104 may receive the test signal sent by test transmitter 102. In the case of measuring the nonlinear effects of the optic path in network 300 (e.g., span 310-3 and span 310-6), optical receiver 702 may receive the signal from ROADM 308-2. In the case of measuring the nonlinear effects of the optic path of cable 101 in measurement configuration 100, optical receiver may receive the test signal from cable 101.

The test signal may include clock information (e.g., as part of the modulation). The clock may be recovered (block 1004). Clock detector 704 may output the recovered clock to demodulator 706. The recovered clock rate may also indicate the data rate of the received test signal and, as discussed above, the data rate may correspond to a signal intensity associated with the received test signal.

The received test signal may be demodulated (block 1006). Using the recovered clock, demodulator 706 may demodulate the received test signal and output the test data to error detector 708. The bit error rate may be determined (block 1008). If the test data includes a pre-determined test pattern, for example, error detector 708 may determine the BER. Error detector 708 may also use CRCs or ECC blocks, or other error detection methods, to determine the BER.

The BER and the data rate may be stored (block 1010). Test receiver 104 may store the data rate and BER in its own memory (e.g., memory 460 in the case where test receiver 104 includes a computing module 400) and/or may send the BER and data rate to network test application 462 (e.g., stored in controller 306) for analysis.

If the test is not complete (block 1012: NO), then process 1000 may continue to block 1002 where another test signal may be received, possibly at a different data rate. If the test is complete (block 1012: NO), then process 1000 may end.

Figure 11:
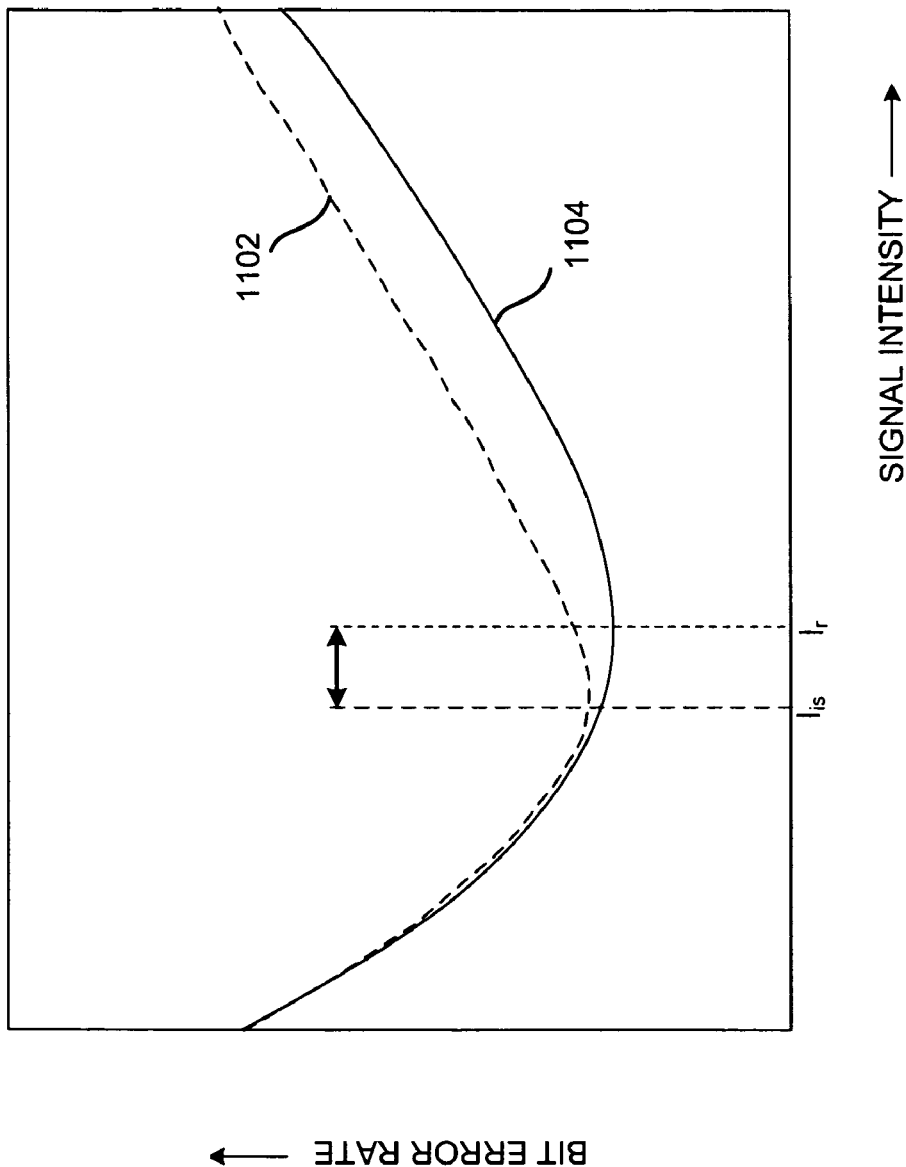
FIG. 11 is an exemplary plot of signal intensity versus bit error rate.

FIG. 11 shows exemplary plots of signal intensity versus BER. In FIG. 11 the abscissa represents signal intensity (e.g., corresponding to the measured data rate) and the ordinate represents BER. In this example, curve 1102 represents the measured data collected by process 800 and 1000 of the optical path shown in network 300. Further, curve 1104 represents the measured data collected by process 800 and 1000 of the fiber 101 shown in measurement configuration 100.

With respect to curve 1102, as the signal intensity increases (e.g., the data rate decreases), the BER first decreases (left half of curve 1102) and then the BER increases (right half of curve 1102). The minimum BER of curve 1102 occurs at measured intensity $I_{is}$, which, in this embodiment, represents the point where the nonlinear penalty overcomes any advantages of an increased OSNR.

The characteristics of curve 1104 are similar to that of curve 1102. As the signal intensity increases (e.g., the data rate decreases), the BER first decreases (left half of curve 1104) and then the BER increases (right half of curve 1104). The minimum BER of curve 1104, however, occurs at measured intensity $I_r$, which, in this example, is to the right of $I_{is}$ of curve 1102. Thus, the nonlinear penalty shown in curve 1102 (the optical path measured in network 300) is greater than the nonlinear penalty of the optical path of cable 101 of configuration 100 (curve 1104). As discussed below, measured intensity $I_r$ of fiber 101 may be a reference intensity for comparing to intensities (e.g., $I_{is}$) of optic paths in deployed (e.g., installed, in-service, etc.) networks, such as network 300.

Figure 12:
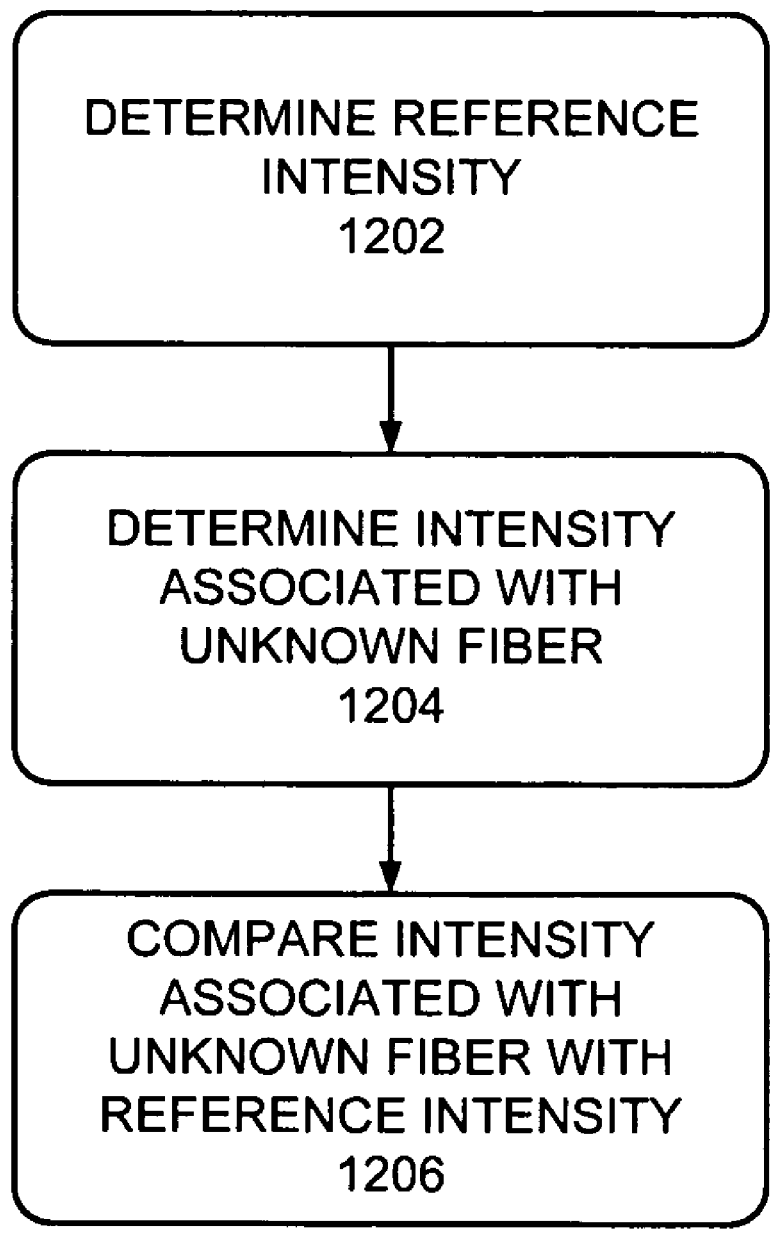
FIG. 12 is a flowchart of an exemplary process for determining the nonlinearity of an unknown optical path.

FIG. 12 is a flowchart of an exemplary process 1200 for determining the nonlinear effects of an unknown fiber in a deployed network. A reference $I_r$ intensity may be determined (block 1202). The reference intensity may be determined by employing processes 800 and 1000 on a known fiber, such as fiber 101 in measurement configuration 100. The known fiber 101 may have nonlinear effects that are known to be acceptable and within budget of an optical communication network. The reference intensity $I_r$ may be determined as shown in FIG. 11.

An intensity associated with an unknown optical path may be determined (block 1204). The intensity associated with the unknown, in-service fiber may be determined by employing processes 800 and 1000 on the in-service optical path, such as fiber span 310-3 and 310-6 between test transmitter 102 and test receiver 104 in network 300. The intensity $I_{is}$ may be determined, as shown in FIG. 11.

The intensity $I_{is}$ of the unknown optical path may be compared to the reference intensity $I_r$ (block 1206). This comparison may determine whether the penalty of the nonlinear effects of the unknown optical path are within budget, e.g., within the limits set by the network designers. End-to-end measurement for an optical path may reveal the overall nonlinear characteristics of the path, even if the path includes multiple fiber spans.

In one embodiment, after an optical fiber is installed in the field, it may be tested using test transmitter 102 and test receiver 104. If the nonlinear penalty of the installed fiber is sufficiently small (e.g., 0.5 dB as compared to a reference), then the installed optical fiber may pass the test and be within the performance budget. If the nonlinear penalty of the installed fiber is too large (e.g., more than 2 dB as compared to a reference), then the installed optical fiber may fail the test, which may call for a diagnosis. In one embodiment, after the test, test transmitter 102 and test receiver 104 may be removed from the end-points of the tested optical fiber for testing a different optical fiber.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, although network 300 includes optical fibers 310 and the embodiments disclosed above are described with respect to optical fibers, embodiments disclosed herein may be applied to any optical path, whether in an optical fiber or not. In addition, embodiments described herein may apply to transmission media other (other than optical media) in which nonlinear characteristics may be analyzed. For example, other transmission media may include wireless radio channels, Ethernet cables, twisted pairs, coaxial cables, etc.

While series of blocks have been described above with respect to different processes, the order of the blocks may differ in other implementations. Moreover, non-dependent acts may be performed in parallel.

It will be apparent that aspects of the embodiments, as described above, may be implemented in many different forms of software, firmware, and hardware in the embodiments illustrated in the figures. The actual software code or specialized control hardware used to implement these embodiments is not limiting of the invention. Thus, the operation and behavior of the embodiments of the invention were described without reference to the specific software code—it being understood that software and control hardware may be designed to the embodiments based on the description herein.

Further, certain portions of the invention may be implemented as "logic" that performs one or more functions. This logic may include hardware, such as an application specific integrated circuit, a field programmable gate array, a processor, or a microprocessor, or a combination of hardware and software.

No element, act, or instruction used in the description of the present application should be construed as critical or essential to the invention unless explicitly described as such. Also, as used herein, the articles "a" and the term "one of" are intended to include one or more items. Further, the phrase "based on" is intended to mean "based, at least in part, on" unless explicitly stated otherwise.

What is claimed is:

1. A network device comprising:
a receiver to receive optical pulses from an optical path, wherein the optical pulses include a plurality of intensities and represent data; and
a processor to determine a rate of bit errors introduced during propagation of the optical pulses through the optical path and to determine a parameter indicative of nonlinear effects of the optical path based on the rate of bit errors and the plurality of intensities.

2. The network device of claim 1, wherein the optical path includes two or more spans of fiber optic cables.

3. The network device of claim 1, wherein the processor is further configured to determine a plurality of bit error rates, each of the plurality of bit error rates corresponding to one of the plurality of intensities.

4. The network device of claim 3, wherein the parameter is indicative of one of the plurality of intensities at which the corresponding bit error rate is lowest of the plurality of bit error rates.

5. The network device of claim 1, wherein an average power of the optical pulses remains below an average power allowed by an optical network device associated with the optical path or wherein the average power of the optical pulses remains substantially constant across the plurality of intensities.

6. The network device of claim 1, wherein the processor is further configured to compare the parameter indicative of the nonlinear effects of the optical path to a reference parameter indicative of allowable nonlinear effects.

7. The network device of claim 1,
wherein the receiver receives the plurality of pulses at a plurality of rates, wherein each rate corresponds to a different one of the plurality of intensities; or
wherein the receiver receives the data at a plurality of data rates, wherein each of the plurality of data rates corresponds to a different one of the plurality of intensities.

8. A computer-implemented method comprising:
transmitting, by a transmitter, optical pulses along an optical path, wherein the pulses include a plurality of intensities and represent transmitted data;
receiving, by a receiver, the optical pulses, having traveled along the optical path, wherein the received optical pulses represent received data;
determining a bit error rate of the received data as compared to the transmitted data; and
determining a parameter indicative of nonlinear effects of the optical path based on the bit error rate and the plurality of intensities.

9. The computer-implemented method of claim 8, wherein the optical path includes two or more spans of fiber optic cables.

10. The computer-implemented method of claim 9,
wherein an average power of the optical pulses remains below an average power allowed by an optical network device associated with the optical path, or
wherein the average power of the optical pulses remains substantially constant across the plurality of intensities.

11. The computer-implemented method of claim 8,
wherein determining the bit error rate includes determining a plurality of bit error rates, each of the plurality of bit error rates corresponding to one of the plurality of intensities.

12. The computer-implemented method of claim 11,
wherein the parameter is indicative of one of the plurality of intensities at which the corresponding bit error rate is lowest of the plurality of bit error rates.

13. The computer-implemented method of claim 8,
comparing the parameter indicative of the nonlinear effects of the optical path to a reference parameter indicative of allowable nonlinear effects.

14. The computer-implemented method of claim 8,
wherein transmitting the optical pulses along the optical path includes transmitting the optical pulses along the optical path at a plurality of rates, wherein each rate corresponds to a different one of the plurality of intensities; or
wherein transmitting the optical pulses along the optical path includes transmitting the data at a plurality of data rates, wherein each of the plurality of data rates corresponds to a different one of the plurality of intensities.

15. A system comprising:
a transmitter to transmit optical pulses along an optical path, wherein the pulses include a plurality of intensities and represent transmitted data;
a receiver to receive the optical pulses, having traveled along the optical path, wherein the received optical pulses represent received data; and
a processor to determine a bit error rate of the received data as compared to the transmitted data and determine a parameter indicative of a nonlinear effects of the optical path based on the bit error rate and the plurality of intensities.

16. The system of claim 15, wherein the optical path includes two or more spans of fiber optic cables.

17. The system of claim 16, wherein the transmitter is configured to transmit the plurality of pulses such that an average power of the optical pulses remains below an average power allowed by an optical network device associated with the optical path or such that the average power of the optical pulses remains substantially constant across the plurality of intensities.

18. The system of claim 15, wherein the processor is further configured to determine a plurality of bit error rates, each of the plurality of bit error rates corresponding to one of the plurality of intensities.

19. The system of claim 18, wherein the parameter is indicative of one of the plurality of intensities at which the corresponding bit error rate is lowest of the plurality of bit error rates.

20. The system of claim 15, wherein the processor is further configured to compare the parameter indicative of the nonlinear effects of the optical path to a reference parameter indicative of allowable nonlinear effects.

21. The system of claim 15,
wherein the transmitter is further configured to transmit the optical pulses along the optical path at a plurality of rates, wherein each rate corresponds to a different one of the plurality of intensities; or
wherein the transmitter is further configured to transmit data along the optical path at a plurality of data rates, wherein each of the plurality of data rates corresponds to a different one of the plurality of intensities.

22. A computer-implemented method comprising:
transmitting, by a transmitter, optical pulses along an optical path, wherein the pulses include a plurality of intensities and wherein an average power of the optical pulses remains substantially constant across the plurality of intensities;
receiving, by a receiver, the optical pulses having traveled along the optical path; and
determining a parameter indicative of nonlinear effects of the optical path based on the plurality of intensities, wherein transmitting the optical pulses along the optical path includes transmitting the optical pulses along the optical path at a plurality of rates, wherein each of the plurality of rates corresponds to a different one of the plurality of intensities, or wherein transmitting the optical pulses along the optical path includes transmitting data at a plurality of data rates, wherein each of the plurality of data rates corresponds to a different one of the plurality of intensities.

23. The computer-implemented method of claim 22, wherein the transmitted pulses represent transmitted data and wherein the received optical pulses represent received data, the computer-implemented method further comprising:

determining a bit error rate of the received data as compared to the transmitted data, wherein determining the parameter indicative of nonlinear effects includes determining the parameter indicative of nonlinear effects based on the bit error rate.

24. The computer-implemented method of claim 23, wherein determining the bit error rate includes determining a plurality of bit error rates, each of the plurality of bit error rates corresponding to one of the plurality of intensities, wherein the parameter is indicative of one of the plurality of intensities corresponding to one of the plurality of bit error rates.

* * * * *